United States Patent
Ko

(10) Patent No.: US 11,567,302 B2
(45) Date of Patent: Jan. 31, 2023

(54) OPTICAL IMAGING SYSTEM

(71) Applicant: SAMSUNG ELECTRO-MECHANICS CO., LTD., Suwon-si (KR)

(72) Inventor: Jung Hui Ko, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 188 days.

(21) Appl. No.: 17/094,875

(22) Filed: Nov. 11, 2020

(65) Prior Publication Data

US 2021/0063706 A1  Mar. 4, 2021

Related U.S. Application Data

(63) Continuation of application No. 16/139,235, filed on Sep. 24, 2018, now Pat. No. 10,866,393, which is a
(Continued)

(30) Foreign Application Priority Data

Nov. 25, 2016  (KR) .......................... 10-2016-0158181

(51) Int. Cl.
*G02B 9/62* (2006.01)
*G02B 13/00* (2006.01)
(Continued)

(52) U.S. Cl.
CPC .......... *G02B 13/0045* (2013.01); *G02B 9/00* (2013.01); *G02B 9/62* (2013.01); *G02B 13/00* (2013.01);
(Continued)

(58) Field of Classification Search
CPC .. G02B 27/0025; G02B 13/00; G02B 13/002; G02B 13/0045; G02B 9/00; G02B 9/62
(Continued)

(56) References Cited

U.S. PATENT DOCUMENTS 5,257,135 A * 10/1993 Kohno ........... G02B 15/143105
                                                     359/713
5,513,046 A *  4/1996 Toyama ................. G02B 13/04
                                                     359/752
(Continued)

FOREIGN PATENT DOCUMENTS

CN       106199904 A     12/2016
CN       106353874 A      1/2017
(Continued)

OTHER PUBLICATIONS

Chinese Office Action dated Dec. 17, 2021 in corresponding Chinese Patent Application No. 202011305336.0. (11 pages in English and 9 pages in Chinese).
(Continued)

*Primary Examiner* — William R Alexander
(74) *Attorney, Agent, or Firm* — NSIP Law

(57) ABSTRACT

An optical imaging system is described including first to sixth lenses sequentially disposed from an object side to an image side, and an image sensor configured to convert incident light reflected from a subject, having passed through the first to sixth lenses, into an electrical signal. One of the first to sixth lenses includes a spherical object-side surface and another of the first to sixth lenses includes corresponding aspherical object-side surfaces. The first to sixth lenses include corresponding aspherical image-side surfaces, and a lens of the first to sixth lenses that is closer to the object side than the one of the first to sixth lenses including the spherical object-side surface, has a highest refractive index among the first to sixth lenses.

15 Claims, 15 Drawing Sheets

Related U.S. Application Data continuation of application No. 15/478,884, filed on Apr. 4, 2017, now Pat. No. 10,114,199.

(51) Int. Cl.
  *G02B 9/00* (2006.01)
  *G02B 27/00* (2006.01)
(52) U.S. Cl.
  CPC ....... *G02B 13/002* (2013.01); *G02B 27/0025* (2013.01)
(58) Field of Classification Search
  USPC ......................................................... 359/713
  See application file for complete search history.

(56) References Cited

U.S. PATENT DOCUMENTS

| | | | |
|---|---|---|---|
| 8,432,619 | B2 | 4/2013 | Huang |
| 9,835,825 | B2 | 12/2017 | Kubota et al. |
| 9,904,033 | B2 | 2/2018 | Komiyama |
| 2011/0157722 | A1 | 6/2011 | Luo |
| 2012/0314304 | A1 | 12/2012 | Huang |
| 2014/0063323 | A1 | 3/2014 | Yamazaki et al. |
| 2014/0118845 | A1 | 5/2014 | Komiyama |
| 2015/0131168 | A1 | 5/2015 | Asami |
| 2015/0131169 | A1* | 5/2015 | Asami ............. G02B 9/62 359/713 |
| 2015/0138425 | A1 | 5/2015 | Lee et al. |
| 2015/0168677 | A1 | 6/2015 | Lee et al. |
| 2015/0168692 | A1* | 6/2015 | Kitahara ........... G02B 13/0045 359/752 |
| 2015/0362697 | A1 | 12/2015 | Hsu et al. |
| 2016/0004046 | A1* | 1/2016 | Asami ............. G02B 13/0045 359/713 |
| 2016/0109688 | A1 | 4/2016 | Jo |
| 2016/0124192 | A1* | 5/2016 | Koreeda ........... G02B 27/0025 359/713 |
| 2016/0131870 | A1* | 5/2016 | Tang ................ G02B 13/0045 359/713 |
| 2016/0131871 | A1* | 5/2016 | Tang ................ G02B 27/0025 359/713 |
| 2016/0131872 | A1* | 5/2016 | Tang ................ G02B 27/0025 359/713 |
| 2016/0131873 | A1* | 5/2016 | Tang ................ G02B 13/0045 359/713 |
| 2016/0131874 | A1* | 5/2016 | Tang ..................... G02B 9/64 359/708 |
| 2016/0161713 | A1 | 6/2016 | Huang |
| 2016/0187617 | A1 | 6/2016 | Komiyama |
| 2016/0187619 | A1 | 6/2016 | Tang et al. |
| 2016/0216481 | A1 | 7/2016 | Chen et al. |
| 2016/0231533 | A1 | 8/2016 | Mercado |
| 2017/0017064 | A1 | 1/2017 | Jo et al. |
| 2017/0108666 | A1 | 4/2017 | Lee |
| 2017/0235109 | A1 | 8/2017 | Shin et al. |
| 2018/0149836 | A1 | 5/2018 | Ko |

FOREIGN PATENT DOCUMENTS

| | | |
|---|---|---|
| CN | 106597636 A | 4/2017 |
| CN | 206946080 U | 1/2018 |
| KR | 10-2014-0087831 A | 7/2014 |
| KR | 10-2015-0007150 A | 1/2015 |
| KR | 10-2015-0070858 A | 6/2015 |
| WO | WO 2014/104787 A1 | 7/2014 |
| WO | WO 2015/005611 A1 | 1/2015 |

OTHER PUBLICATIONS

Chinese Office Action dated Oct. 28, 2019 in counterpart Chinese Patent Application No. 201710442173.2 (10 pages in English, 7 pages in Korean).

* cited by examiner

| FIRST EMBODIMENT | | | | | | |
|---|---|---|---|---|---|---|
| f= 3.5976mm   Fno= 1.99   HFOV= 37.98 deg   ImgH= 2.9mm | | | | | | |
| | SURFACE NO. | RADIUS OF CURVATURE | THICKNESS OR DISTANCE | REFRACTIVE INDEX | ABBE NUMBER | FOCAL LENGTH | EFFECTIVE RADIUS |
| FIRST LENS | S1 | 1.32697 | 0.672 | 1.5441 | 56.1 | 2.6218 | 0.91 |
| | S2 | 15.9674 | 0.048 | | | | 0.84 |
| SECOND LENS | S3 | 10.28296 | 0.291 | 1.6612 | 20.3 | -5.9743 | 0.79 |
| | S4 | 2.82174 | 0.236 | | | | 0.68 |
| THIRD LENS | S5 | -28.43206 | 0.274 | 1.5441 | 56.1 | 12.9389 | 0.72 |
| | S6 | -5.66201 | 0.04 | | | | 0.89 |
| FOURTH LENS | S7 | -23.037 | 0.25 | 1.6504 | 21.5 | -12.4925 | 1.04 |
| | S8 | 12.60593 | 0.333 | | | | 1.18 |
| FIFTH LENS | S9 | -1302.696 | 0.436 | 1.6504 | 21.5 | -379.999 | 1.25 |
| | S10 | 305.06107 | 0.051 | | | | 1.65 |
| SIXTH LENS | S11 | 2.011586 | 0.648 | 1.5168 | 55.7 | -15.6656 | 2.21 |
| | S12 | 1.4344 | 0.16 | | | | 2.25 |
| INFRARED CUT-OFF FILTER | S13 | Infinity | 0.11 | | | | |
| | S14 | Infinity | 0.626 | | | | |
| IMAGING PLANE | S15 | Infinity | | | | | |

FIG. 4

| SURFACE NO. | S1 | S2 | S3 | S4 | S5 | S6 |
|---|---|---|---|---|---|---|
| Conic Constant (K) | -0.39217 | -11.25 | -12.3648 | 10.42367 | -0.88523 | -5.66201 |
| 4th Order Coefficient (A) | -0.00913 | -0.181 | -0.1557 | -0.06483 | -0.1232 | 8.24536 |
| 6th Order Coefficient (B) | 0.11639 | 0.3049 | 0.46687 | 0.14111 | -0.08189 | 0.06765 |
| 8th Order Coefficient (C) | -0.60059 | -0.108 | -0.24359 | 0.14837 | -0.39311 | 0.00495 |
| 10th Order Coefficient (D) | 1.6853 | -1.341 | -0.88293 | -1.055 | 0.65737 | -1.51971 |
| 12th Order Coefficient (E) | -3.04425 | 4.0868 | 2.82499 | 2.22953 | -0.39464 | 4.41753 |
| 14th Order Coefficient (F) | 3.25064 | -6.242 | -3.72514 | -2.21176 | 0.11672 | -6.94549 |
| 16th Order Coefficient (G) | -1.95787 | 5.1061 | 2.61944 | 1.01799 | -0.01726 | 2.73346 |
| 18th Order Coefficient (H) | 0.58064 | -1.755 | -0.78127 | 0 | 0.00103 | 0.36145 |

| SURFACE NO. | S8 | S9 | S10 | S11 | S12 | |
|---|---|---|---|---|---|---|
| Conic Constant (K) | -28.58987 | 81.03 | -99 | -15.79119 | -0.70834 | |
| 4th Order Coefficient (A) | -0.11642 | 0.2183 | 0.02262 | -0.33126 | -0.38572 | |
| 6th Order Coefficient (B) | -0.03979 | -0.644 | -0.02542 | 0.20693 | 0.26871 | |
| 8th Order Coefficient (C) | 0.3605 | 0.8477 | -0.05337 | -0.06451 | -0.16407 | |
| 10th Order Coefficient (D) | -0.30202 | -0.879 | 0.0453 | 0.01209 | 0.06982 | |
| 12th Order Coefficient (E) | 0.13018 | 0.565 | -0.01484 | -0.0014 | -0.01911 | |
| 14th Order Coefficient (F) | -0.02636 | -0.203 | 0.00234 | 9.69E-05 | 0.00316 | |
| 16th Order Coefficient (G) | 0.00213 | 0.0374 | -0.00018 | -3.65E-06 | -0.00028 | |
| 18th Order Coefficient (H) | -1.69E-05 | -0.003 | 5.45E-06 | 5.78E-08 | 1.06E-05 | |

FIG. 5

| SECOND EMBODIMENT ||||||||
|---|---|---|---|---|---|---|---|
| f = 3.5947mm  Fno = 1.99  HFOV = 38.0 deg  ImgH = 2.9mm ||||||||
| | SURFACE NO. | RADIUS OF CURVATURE | THICKNESS OR DISTANCE | REFRACTIVE INDEX | ABBE NUMBER | FOCAL LENGTH | EFFECTIVE RADIUS |
| FIRST LENS | S1 | 1.32889 | 0.671 | 1.5441 | 56.1 | 2.8207 | 0.91 |
| | S2 | 16.0501 | 0.048 | | | | 0.838 |
| SECOND LENS | S3 | 10.31434 | 0.29 | 1.6612 | 20.3 | -5.9619 | 0.79 |
| | S4 | 2.82009 | 0.237 | | | | 0.68 |
| THIRD LENS | S5 | -27.31753 | 0.275 | 1.5441 | 56.1 | 12.9714 | 0.7 |
| | S6 | -5.62858 | 0.04 | | | | 0.93 |
| FOURTH LENS | S7 | -21.86676 | 0.25 | 1.6504 | 21.5 | -12.446 | 1.13 |
| | S8 | 12.91079 | 0.38 | | | | 1.28 |
| FIFTH LENS | S9 | -916.4029 | 0.43 | 1.6504 | 21.5 | -373.7857 | 1.31 |
| | S10 | 330.9528 | 0.052 | | | | 1.71 |
| SIXTH LENS | S11 | 2.0052 | 0.653 | 1.5168 | 55.7 | -16.0742 | 2.21 |
| | S12 | 1.43607 | 0.16 | | | | 2.36 |
| INFRARED CUT-OFF FILTER | S13 | Infinity | 0.11 | | | | |
| | S14 | Infinity | 0.626 | | | | |
| IMAGING PLANE | S15 | Infinity | | | | | |

FIG. 9

| SURFACE NO. | S1 | S2 | S3 | S4 | S5 | S6 |
|---|---|---|---|---|---|---|
| Conic Constant (K) | -0.3323 | -11.25384 | -12.36476 | 10.41254 | -0.88523 | 8.24535 |
| 4th Order Coefficient (A) | -0.099 | -0.17912 | -0.15584 | -0.06472 | -0.12404 | 0.06465 |
| 6th Order Coefficient (B) | 0.118 | 0.27523 | 0.4702 | 0.14259 | -0.07696 | 0.02601 |
| 8th Order Coefficient (C) | -0.59889 | 0.12497 | -0.27152 | 0.14343 | -0.40336 | -1.57944 |
| 10th Order Coefficient (D) | 1.67587 | -2.38289 | -0.82767 | -1.04578 | 0.65729 | 4.50361 |
| 12th Order Coefficient (E) | -3.02315 | 6.78801 | 2.76285 | 2.22144 | -0.3998 | -7.01443 |
| 14th Order Coefficient (F) | 3.22536 | -10.2725 | -3.6922 | -2.20969 | 0.11821 | 6.38183 |
| 16th Order Coefficient (G) | -1.94263 | 8.33286 | 2.61168 | 1.01873 | -0.01749 | -2.71683 |
| 18th Order Coefficient (H) | 0.49649 | -2.82834 | -0.7799 | -0.17606 | 0.00104 | 0.356512 |
| SURFACE NO. | S7 | S8 | S9 | S10 | S11 | S12 |
| Conic Constant (K) | -28.59697 | 81.03004 | -98.99399 | -15.72561 | -0.70305 | |
| 4th Order Coefficient (A) | -0.11456 | 0.22611 | 0.02396 | -0.33247 | -0.38506 | |
| 6th Order Coefficient (B) | -0.04899 | -0.6576 | -0.02874 | 0.20824 | 0.22636 | |
| 8th Order Coefficient (C) | 0.3149 | 0.86623 | -0.05211 | -0.06507 | -0.16363 | |
| 10th Order Coefficient (D) | -0.31376 | -0.89577 | 0.14553 | 0.01221 | 0.08951 | |
| 12th Order Coefficient (E) | 0.13577 | 0.57428 | -0.01479 | -0.00141 | -0.01893 | |
| 14th Order Coefficient (F) | -0.02791 | -0.20609 | 0.00233 | 9.86E-05 | 0.00312 | |
| 16th Order Coefficient (G) | 0.00236 | 0.0379 | -0.00018 | -3.70E-06 | -0.00023 | |
| 18th Order Coefficient (H) | -3.19E-05 | -0.00277 | 5.44E-06 | 5.80E-08 | 1.05E-05 | |

FIG. 10

| THIRD EMBODIMENT ||||||||
| --- | --- | --- | --- | --- | --- | --- | --- |
| f= 3.5943mm  Fno= 1.99  HFOV= 38.0 deg  ImgH= 3.08mm ||||||||
| | SURFACE NO. | RADIUS OF CURVATURE | THICKNESS OR DISTANCE | REFRACTIVE INDEX | ABBE NUMBER | FOCAL LENGTH | EFFECTIVE RADIUS |
| FIRST LENS | S1 | 1.32874 | 0.671 | 1.5441 | 56.1 | 2.6206 | 0.91 |
| | S2 | 16.03299 | 0.048 | | | | 0.84 |
| SECOND LENS | S3 | 10.30544 | 0.291 | 1.6612 | 20.3 | -5.9609 | 0.79 |
| | S4 | 2.81895 | 0.238 | | | | 0.68 |
| THIRD LENS | S5 | -26.88791 | 0.275 | 1.5441 | 56.1 | 13.0307 | 0.72 |
| | S6 | -5.630797 | 0.04 | | | | 0.94 |
| FOURTH LENS | S7 | -22.25344 | 0.25 | 1.6504 | 21.5 | -12.4783 | 1.14 |
| | S8 | 12.83153 | 0.331 | | | | 1.29 |
| FIFTH LENS | S9 | -800 | 0.428 | 1.6504 | 21.5 | -362.3299 | 1.31 |
| | S10 | 334.13724 | 0.052 | | | | 1.72 |
| SIXTH LENS | S11 | 2.00385 | 0.652 | 1.5168 | 55.7 | -16.1613 | 2.21 |
| | S12 | 1.43695 | 0.16 | | | | 2.37 |
| INFRARED CUT-OFF FILTER | S13 | Infinity | 0.11 | | | | |
| | S14 | Infinity | 0.625 | | | | |
| IMAGING PLANE | S15 | Infinity | | | | | |

FIG. 14

| SURFACE NO. | S1 | S2 | S3 | S4 | S5 |
|---|---|---|---|---|---|
| Conic Constant (K) | -0.33281 | -11.25384 | -12.36 | 10.40806 | -0.88523 |
| 4th Order Coefficient (A) | -0.00897 | -0.17862 | -0.155 | -0.06399 | -0.12394 |
| 6th Order Coefficient (B) | 0.1148 | 0.27384 | 0.4639 | 0.13736 | -0.07769 |
| 8th Order Coefficient (C) | -0.59478 | 0.09864 | -0.241 | 0.16132 | -0.40184 |
| 10th Order Coefficient (D) | 1.6704 | -2.18156 | -0.895 | -1.078 | 0.66573 |
| 12th Order Coefficient (E) | -3.01944 | 6.15484 | 2.8425 | 2.25567 | -0.39892 |
| 14th Order Coefficient (F) | 3.22512 | -9.23492 | -3.742 | -2.23217 | 0.11794 |
| 16th Order Coefficient (G) | -1.94322 | 7.44743 | 2.6256 | 1.02723 | -0.01744 |
| 18th Order Coefficient (H) | 0.49647 | -2.51798 | -0.781 | -0.17741 | 0.001 |
| SURFACE NO. | S8 | S9 | S10 | S11 | S12 |
| Conic Constant (K) | 8.24535 | -28.59987 | 81.03 | -99 | -15.74921 | -0.70756 |
| 4th Order Coefficient (A) | 0.06244 | -0.11383 | 0.2283 | 0.02634 | -0.33351 | -0.38477 |
| 6th Order Coefficient (B) | 0.04573 | -0.06258 | -0.663 | -0.02942 | 0.20926 | 0.26731 |
| 8th Order Coefficient (C) | -1.65242 | 0.3217 | 0.8745 | -0.05162 | -0.0655 | -0.16251 |
| 10th Order Coefficient (D) | 4.65622 | -0.3202 | -0.905 | 0.0453 | 0.01231 | 0.06889 |
| 12th Order Coefficient (E) | -7.18648 | 0.13917 | 0.58 | -0.01473 | -0.00143 | -0.01881 |
| 14th Order Coefficient (F) | 6.44271 | -0.02893 | -0.208 | 0.00232 | 9.93E-05 | 0.0031 |
| 16th Order Coefficient (G) | -2.75175 | 0.00252 | 0.0383 | -0.00017 | -3.75E-06 | -0.00027 |
| 18th Order Coefficient (H) | 0.36034 | -4.22E-05 | -0.003 | 5.42E-06 | 5.87E-08 | 1.04E-05 |

FIG. 15

OPTICAL IMAGING SYSTEM

CROSS-REFERENCE TO RELATED APPLICATIONS

This application is a continuation application of U.S. application Ser. No. 16/139,235, filed on Sep. 24, 2018, now U.S. Pat. No. 10,866,393, which is a continuation of U.S. application Ser. No. 15/478,884 filed on Apr. 4, 2017, now U.S. Pat. No. 10,114,199, which claims benefit of priority under 35 USC § 119 (a) to Korean Patent Application No. 10-2016-0158181 filed on Nov. 25, 2016 in the Korean Intellectual Property Office, the entire disclosures of which are incorporated herein by for all purposes.

BACKGROUND

1. Field

The following description relates to an optical imaging system.

2. Description of Related Art

Recently, mobile communications terminals have been provided with camera modules, enabling video calls to be made and images to be captured. In addition, as levels of functionality of camera modules in such mobile communications terminals have gradually increased, camera modules installed in mobile communications terminals have gradually been required to have higher levels of resolution and performance.

In addition, in accordance with the recent trend for miniaturization of the camera modules, aspherical surfaces have been configured for all lenses disposed in camera modules in order to implement a high level of resolution while having a small or compact size.

However, in a case in which the aspherical surfaces are applied to all of the lenses, a performance of the camera module changes and productivity is reduced due to a manufacturing tolerance or an assembly tolerance of the respective lenses.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an optical imaging system, including: first to sixth lenses sequentially disposed from an object side to an image side; and an image sensor configured to convert incident light reflected from a subject, having passed through the first to sixth lenses, into an electrical signal, wherein one of the first to sixth lenses may include a spherical object-side surface and another of the first to sixth lenses may include corresponding aspherical object-side surfaces, the first to sixth lenses may include corresponding aspherical image-side surfaces, and a lens of the first to sixth lenses that is closer to the object side than the one of the first to sixth lenses including the spherical object-side surface, may include a highest refractive index among the first to sixth lenses.

TTL/(2*ImgH)<0.75 may be satisfied, where TTL is a distance from the object-side surface of the first lens to an imaging plane of the image sensor and ImgH is half a diagonal length of the imaging plane of the image sensor.

The one of the first sixth lenses including the spherical object-side surface may be the fourth lens.

The lens of the first to sixth lenses that includes the highest refractive index among the first to sixth lenses may be the second lens.

2.0<f3/f1<6.0 may be satisfied, where f1 is a focal length of the first lens and f3 is a focal length of the third lens.

f/(CT3+CT4+CT5)<4.0 may be satisfied, where f is an overall focal length of the optical imaging system, CT3 is a thickness of the third lens in a paraxial region, CT4 is a thickness of the fourth lens in the paraxial region, and CT5 is a thickness of the fifth lens in the paraxial region.

|f/f5|+|f/f6|<1.0 may be satisfied, where f is an overall focal length of the optical imaging system, f5 is a focal length of the fifth lens, and f6 is a focal length of the sixth lens.

The first to sixth lenses may include a positive refractive power, a negative refractive power, positive refractive power, a negative refractive power, a negative refractive power, and a negative refractive power, respectively.

The first lens may include a positive refractive power and a meniscus shape of which the object-side surface may be convex, and the second lens may have a negative refractive power and a meniscus shape of which the object-side surface may be convex.

The second lens may have a negative refractive power and a meniscus shape of which the object-side surface may be convex, and the third lens may have a positive refractive power and a meniscus shape of which the image-side surface may be convex.

The fourth lens has a negative refractive power.

The object-side surface and the image-side surface of the fourth lens may be concave.

The fifth lens may have a negative refractive power.

The object-side surface and the image-side surface of the fifth lens may be concave.

The sixth lens may have a negative refractive power and a meniscus shape of which the object-side surface may be convex.

The optical imaging system may also include a stop disposed between the first lens and the second lens.

In accordance with an embodiment, there is provided an optical imaging system, including: first to sixth lenses sequentially disposed from an object side; and an image sensor configured to convert incident light reflected from a subject, having passed through the first to sixth lenses, into an electrical signal, wherein a fourth lens of the first to sixth lenses may include a spherical object-side surface and an aspherical image-side surface, excluding the fourth lens, the first to sixth lenses may include corresponding aspherical object-side surfaces and aspherical image-side surfaces, the second lens may include a highest refractive index among the first to sixth lenses, and TTL/(2*mgH)<0.75 is satisfied, where TTL is a distance from an object-side surface of the first lens to an imaging plane of the image sensor and ImgH is half a diagonal length of the imaging plane of the image sensor.

The refractive index of the second lens may be greater than 1.66.

In accordance with an embodiment, there is provided an optical imaging system, including: a first lens including a positive refractive power a second lens including a negative refractive power and including a refractive index greater than 1.66; a third lens including a positive refractive power; a fourth lens including a negative refractive power a fifth lens including a negative refractive power; and a sixth lens including a negative refractive power, wherein, excluding one of an object-side surface of one of the first to sixth lenses, either one or both of the object-side surface and an image-side surface of each of the first to sixth lenses is aspherical.

The one of the object-side surface of one of the first to sixth lenses comprises a spherical object-side surface and a highest refractive index among the first to sixth lenses.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 4 is a table illustrating respective characteristics of lenses of the optical imaging system illustrated in FIG. 1;

FIG. 5 is a table illustrating respective aspherical coefficients of lenses of the optical imaging system illustrated in FIG. 1;

FIG. 9 is a table illustrating respective characteristics of lenses of the optical imaging system illustrated in FIG. 6;

FIG. 10 is a table illustrating respective aspherical coefficients of lenses of the optical imaging system illustrated in FIG. 6;

FIG. 14 is a table illustrating respective characteristics of lenses of the optical imaging system illustrated in FIG. 11; and FIG. 15 is a table illustrating respective aspherical coefficients of lenses of the optical imaging system illustrated in FIG. 11.

Figure 1:
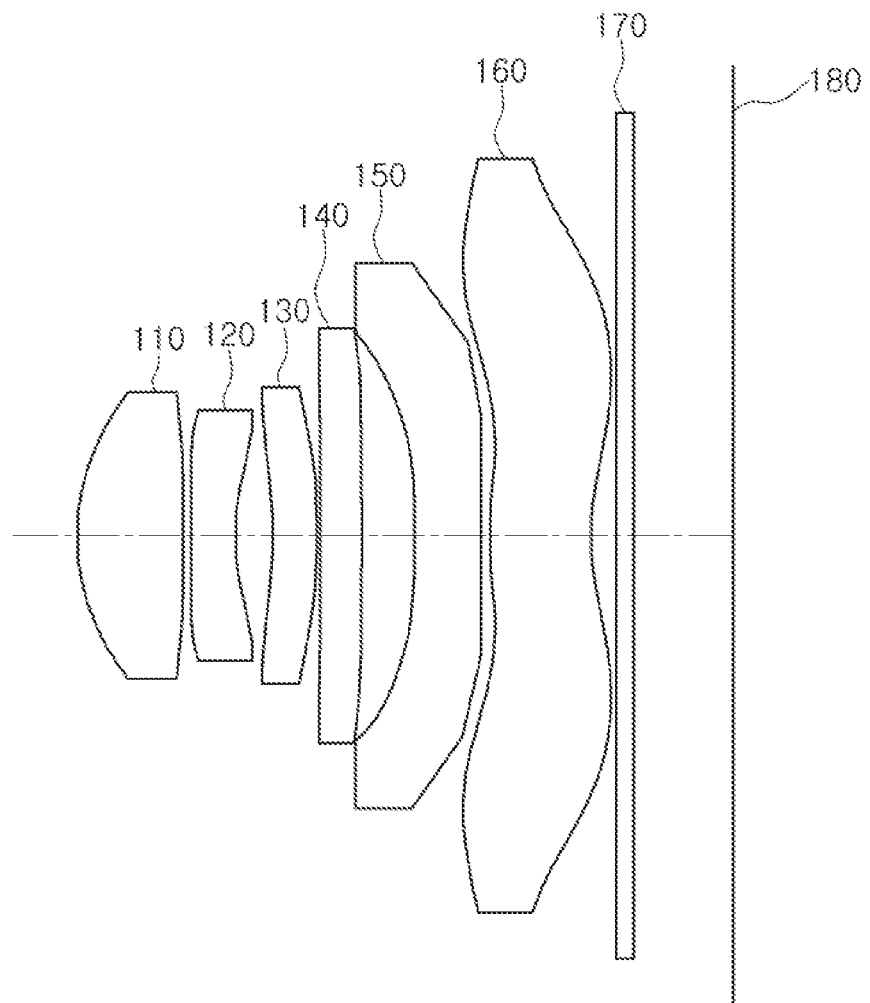
FIG. 1 is a view illustrating an optical imaging system, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Hereinafter, various embodiments will be described with reference to schematic views. In the drawings, for example, due to manufacturing techniques and/or tolerances, modifications of the shape shown may be estimated. Thus, embodiments should not be construed as being limited to the particular shapes of regions shown herein, for example, to include a change in shape results in manufacturing. The following embodiments may also be formed by one or a combination thereof.

Figure 6:
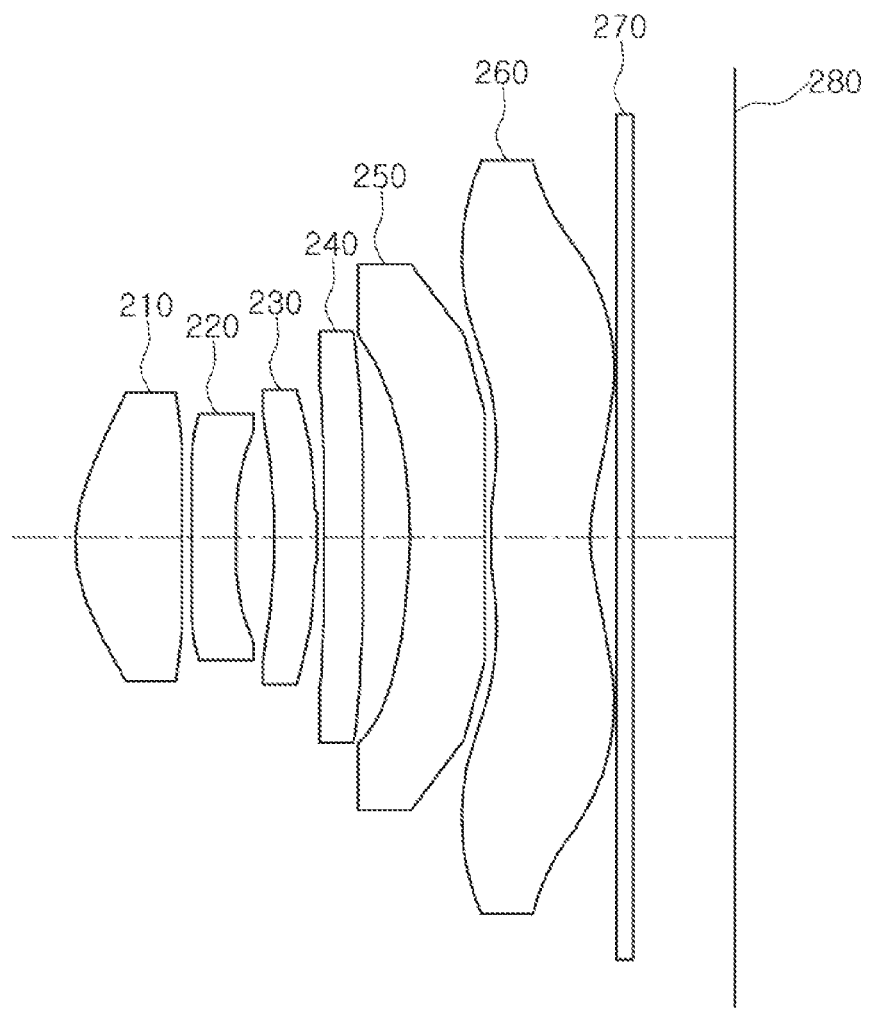
FIG. 6 is a view illustrating an optical imaging system, according to a second embodiment.
Figure 11:
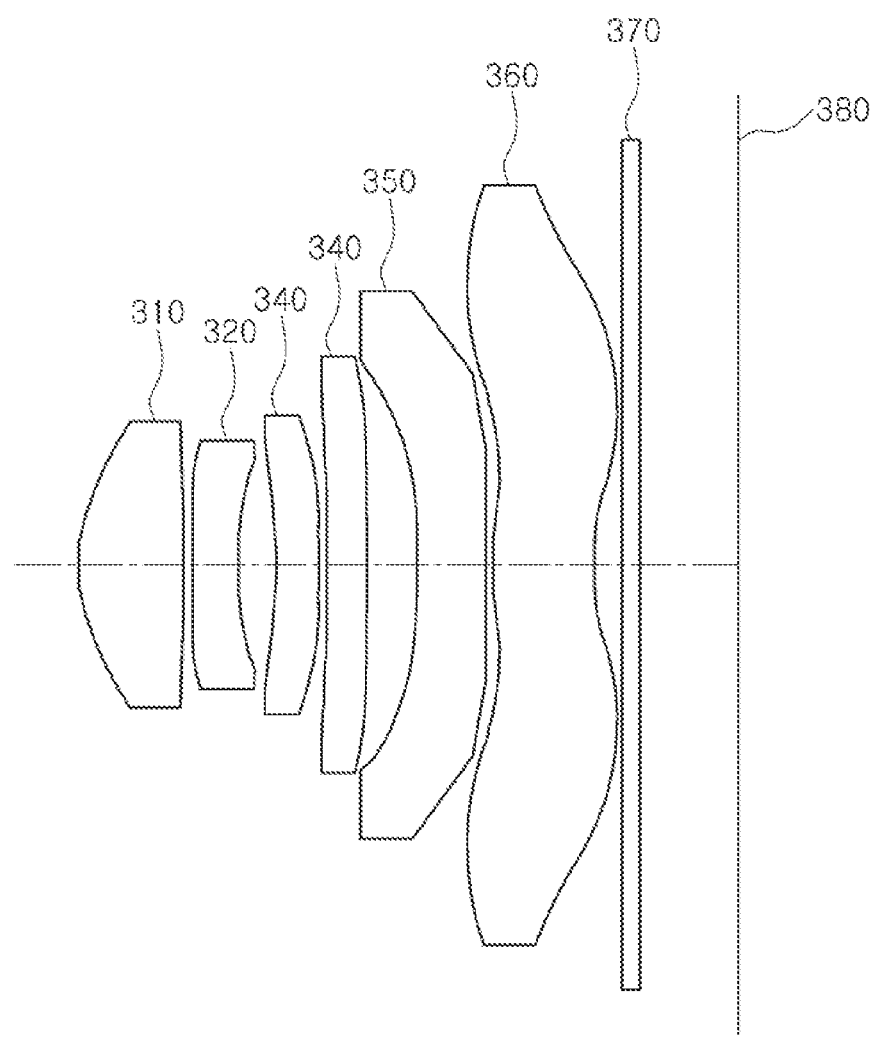
FIG. 11 is a view illustrating an optical imaging system, according to a third embodiment.

In addition, even though one surface of each of lenses is illustrated to be convex in FIGS. 1, 6, and 11, referring to Tables representing the respective characteristics of the lenses of FIGS. 4, 9, and 14, an actual shape of the corresponding surface may be concave or flat. Likewise, even though one surface of each of lenses is illustrated to be concave, an actual shape of the corresponding surface may be convex or flat.

In accordance with an embodiment, an optical imaging system is described in which an aberration improvement effect is increased, a high level of resolution is implemented, and an influence due to a manufacturing tolerance or an assembling tolerance is significantly reduced.

In accordance with an embodiment, a first lens is a lens closest to an object or a subject from which an image is captured, while a sixth lens is a lens closest to an image sensor or closest to an imaging plane.

In addition, a first surface of each lens refers to a surface thereof closest to an object side (or an object-side surface) and a second surface of each lens refers to a surface thereof closest to an image side (or an image-side surface). Further, all numerical values of radii of curvature and thicknesses of lenses, ImgH (half a diagonal length of an imaging plane of the image sensor), and the like, are indicated in millimeters (mm), and a field of view (FOV) of an optical imaging system is indicated in degrees.

Further, concerning shapes of the lenses, such shapes are represented in relation to optical axes of the lenses. A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

The paraxial region refers to a very narrow region in the vicinity of an optical axis.

An optical imaging system, according to embodiments, may include six lenses.

In addition, in an embodiment, thicknesses and radii of curvatures of lenses are measured in relation to optical axes of the corresponding lenses.

For example, the optical imaging system according to the embodiments may include a first lens, a second lens, a third lens, a fourth lens, a fifth lens, and a sixth lens sequentially disposed from the object side to the image side. However, a person of ordinary skill in the relevant art will appreciate that the number of lenses in the optical system may vary, for example, between two to six lenses, while achieving the various results and benefits described hereinbelow.

Further, the optical imaging system according to the embodiments is not limited to only including six lenses, but may further include other components, if necessary.

For example, the optical imaging system may further include an image sensor that converts light, reflected from a subject, incident on the image sensor into an electrical signal.

In addition, the optical imaging system may further include an infrared cut-off filter filtering infrared light. The infrared cut-off filter may be disposed between the sixth lens and the image sensor.

In addition, the optical imaging system may further include a stop controlling an amount of light. For example, the stop may be disposed between the first and second lenses.

In the optical imaging system, according to the embodiments, the first to sixth lenses may be formed of plastic or a polyurethane material or glass.

In addition, at least one of the first to sixth lenses may have an aspherical surface. Further, each of the first to sixth lenses may have at least one aspherical surface. In other embodiments, all of the first to sixth lenses may be spherical lenses, or all of the first to sixth lenses may be aspherical lenses.

That is, at least one of first and second surfaces of all of the first to sixth lenses may be aspherical. Here, the aspherical surfaces of the first to sixth lenses may be represented by the following Equation 1:

$$Z = \frac{cY^2}{1+\sqrt{1-(1+K)c^2Y^2}} + AY^4 + BY^6 + CY^8 + DY^{10} + EY^{12} + FY^{14} + \dots \quad \text{[Equation 1]}$$

In an example, c is a curvature (an inverse of a radius of curvature) of a lens, K is a conic constant, and Y is a distance from a certain point on an aspherical surface of the lens to an optical axis in a direction perpendicular to the optical axis. In addition, constants A to F are aspherical coefficients.

In addition, Z is a distance between the certain point on the aspherical surface of the lens at the distance Y and a tangential plane meeting the apex of the aspherical surface of the lens.

The optical imaging system including the first to sixth lenses may have a positive refractive power/a negative refractive power/a positive refractive power/a negative refractive power/a negative refractive power/a negative refractive power sequentially from the object side towards the image side. However, although each lens is described with a particular refractive power, a different refractive power for at least one of the lenses may be used to achieve the intended result.

The optical imaging system configured, as described above, improves optical performance through aberration improvement.

The optical imaging system, according to the embodiments, satisfies Conditional Expression 1.

$2.0 < f3/f1 < 6.0$  [Conditional Expression 1]

In an example, f1 is a focal length of the first lens, and f3 is a focal length of the third lens.

The optical imaging system, according to the embodiments, satisfies Conditional Expression 2.

$f/(CT3+CT4+CT5) < 4.0$  [Conditional Expression 2]

In an example, f is an overall focal length of the optical imaging system, CT3 is a thickness of the third lens in the paraxial region, CT4 is a thickness of the fourth lens in the paraxial region, and CT5 is a thickness of the fifth lens in the paraxial region.

The optical imaging system, according to the embodiments, satisfies Conditional Expression 3.

$f/f5+f/f6 < 1.0$  [Conditional Expression 3]

In an example, f is an overall focal length of the optical imaging system, f5 is a focal length of the fifth lens, and f6 is a focal length of the sixth lens.

The optical imaging system, according to the embodiments, satisfies Conditional Expression 4.

$TTL/(2 \times ImgH) < 0.75$  [Conditional Expression 4]

In an example, TTL is the distance from an object-side surface of the first lens to an imaging plane of the image sensor, and ImgH is half a diagonal length of the image sensor.

Referring to Table 1, the optical imaging system, according to the embodiments, satisfies Conditional Expressions 1 to 4.

TABLE 1

|  | First Embodiment | Second Embodiment | Third Embodiment |
|---|---|---|---|
| f3/f1 | 4.9351 | 4.9496 | 4.9724 |
| f/(CT3 + CT4 + CT5) | 3.7475 | 3.7641 | 3.7716 |
| \|f/f5\| + \|f/f6\| | 0.2391 | 0.2333 | 0.2323 |
| TTL/(2 × ImgH) | 0.7198 | 0.7193 | 0.6815 |

Next, the first to sixth lenses forming the optical imaging system, according to the embodiments, will be described.

The first lens has a positive refractive power. In addition, the first lens has a meniscus shape of which an object-side surface is convex. For example, a first surface (object-side surface) of the first lens is convex in the paraxial region, and a second surface (image-side surface) of the first lens is concave in the paraxial region.

At least one of the first and second surfaces of the first lens is aspherical. For example, both surfaces of the first lens are aspherical.

The second lens has a negative refractive power. In addition, the second lens may have a meniscus shape of which an object-side surface is convex. In detail, a first surface (object-side surface) of the second lens is convex in the paraxial region, and a second surface (image-side surface) of the second lens is concave in the paraxial region.

At least one of the first and second surfaces of the second lens is aspherical. For example, both surfaces of the second lens are aspherical. In an embodiment, among the first to sixth lenses, the second lens has the highest refractive index.

The third lens has a positive refractive power. In addition, the third lens may have a meniscus shape of which an image-side surface is convex. In detail, a first surface (object-side surface) of the third lens is concave in the paraxial region, and a second surface (image-side surface) of the third lens is convex in the paraxial region.

At least one of the first and second surfaces of the third lens is aspherical. For example, both surfaces of the third lens are aspherical.

The fourth lens has a negative refractive power. In addition, both surfaces (object-side surface and image-side surface) of the fourth lens are concave. In an embodiment, first and second surfaces of the fourth lens are concave in the paraxial region.

Any one of the first and second surfaces of the fourth lens is aspherical. For example, the first surface of the fourth lens is spherical, and the second surface of the fourth lens is aspherical.

The fifth lens has a negative refractive power. In addition, both surfaces of the fifth lens are concave. In an embodiment, first and second (object-side surface and image-side surface) surfaces of the fifth lens are concave in the paraxial region.

At least one of the first and second surfaces of the fifth lens is aspherical. For example, both surfaces of the fifth lens are aspherical.

The sixth lens has a negative refractive power. In addition, the sixth lens has a meniscus shape of which an object-side surface is convex. In detail, a first surface (object-side surface) of the sixth lens is convex in the paraxial region, and a second surface (image-side surface) of the sixth lens is concave in the paraxial region.

At least one of the first and second surfaces of the sixth lens is aspherical. For example, both surfaces of the sixth lens are aspherical.

In addition, at least one inflection point may be formed on at least one of the first and second surfaces of the sixth lens. For example, the first surface of the sixth lens is convex in the paraxial region and becomes concave toward an edge thereof. In addition, the second surface of the sixth lens is concave in the paraxial region and becomes convex toward an edge thereof.

In the optical imaging system configured as described above, a plurality of lenses perform an aberration correction function to increase aberration improvement performance. Although the optical imaging system is described as the fourth lens having any one of the surfaces being spherical, in an alternative embodiment, any of the surfaces of the other lenses may be configured as spherical. More than one surface (object-side surface and/or image-side surface) of any of the lenses may be configured to be spherical.

In a case in which the optical imaging system is miniaturized, there is a risk that performance of the optical imaging system will change due to a manufacturing tolerance or an assembling tolerance of the respective lenses. As an example, as the optical imaging system is miniaturized, sensitivity of the lenses increase, such that a performance change of the optical imaging system due to the manufacturing tolerance or the assembling tolerance of the respective lenses is intensified.

Particularly, in a case in which aspherical surfaces are applied to all of the lenses, an influence due to the manufacturing tolerance or the assembling tolerance may be increased.

However, in the optical imaging system according to the embodiments, one surface of any one of the plurality of lenses (for example, an object-side surface of the fourth lens) is configured to be spherical, and any one (for example, the second lens) of lenses disposed in front of the lens (that is, disposed adjacently to an object-side surface of the lens) is designed to have the highest refractive index (for example, the second lens may be designed to have a refractive index greater than 1.66), such that a demand for miniaturization of the optical imaging system may be satisfied and a performance change of the optical imaging system due to the manufacturing tolerance or the assembling tolerance may be prevented.

An optical imaging system, according to a first embodiment, will be described with reference to FIGS. 1 through 5.

The optical imaging system, according to the first embodiment, includes an optical system including a first lens 110, a second lens 120, a third lens 130, a fourth lens 140, a fifth lens 150, and a sixth lens 160, and may further include a stop, an infrared cut-off filter 170, and an image sensor 180.

As illustrated in FIG. 4, a focal length (f1) of the first lens 110 is 2.6218 mm, a focal length (f2) of the second lens 120 is −5.9743 mm, a focal length (f3) of the third lens 130 is 12.9389 mm, a focal length (f4) of the fourth lens 140 is −12.4925 mm, a focal length (f5) of the fifth lens 150 is −379.999 mm, a focal length (f6) of the sixth lens 160 is −15.6656 mm, and an overall focal length (f) of the optical imaging system is 3.5976 mm.

Further, respective characteristics (radii of curvature, thicknesses of lenses or distances between lenses, refractive indices, Abbe numbers, and effective radii) of the lenses are illustrated in FIG. 4.

In the first embodiment, the first lens 110 has a positive refractive power, and a meniscus shape of which an object-side surface is convex. For example, a first surface of the first lens 110 is convex in the paraxial region, and a second surface thereof is concave in the paraxial region.

The second lens 120 has a negative refractive power and a meniscus shape of which an object-side surface is convex. For example, a first surface of the second lens 120 is convex in the paraxial region, and a second surface thereof is concave in the paraxial region.

The third lens 130 has a positive refractive power and a meniscus shape of which an image-side surface is convex. For example, a first surface of the third lens 130 is concave in the paraxial region, and a second surface thereof is convex in the paraxial region.

The fourth lens 140 has a negative refractive power, and both surfaces thereof are concave. For example, first and second surfaces of the fourth lens 140 are concave in the paraxial region.

The fifth lens 150 has a negative refractive power, and both surfaces thereof are concave. For example, first and second surfaces of the fifth lens 150 are concave in the paraxial region.

The sixth lens 160 has a negative refractive power, and a meniscus shape of which an object-side surface is convex. For example, a first surface of the sixth lens 160 is convex in the paraxial region, and a second surface of the sixth lens 160 is concave in the paraxial region.

In addition, at least one inflection point may be formed on at least one of the first and second surfaces of the sixth lens 160.

Further, the respective surfaces of the first to sixth lenses 110 to 160 may have aspherical coefficients as illustrated in FIG. 5. For example, all of the first and second surfaces of the first lens 110, the second lens 120, the third lens 130, the fifth lens 150, and the sixth lens 160 are aspherical. In addition, the first surface of the fourth lens 140 is spherical, and the second surface thereof is aspherical.

In addition, the stop is disposed between the first and second lenses 110 and 120.

Figure 2:
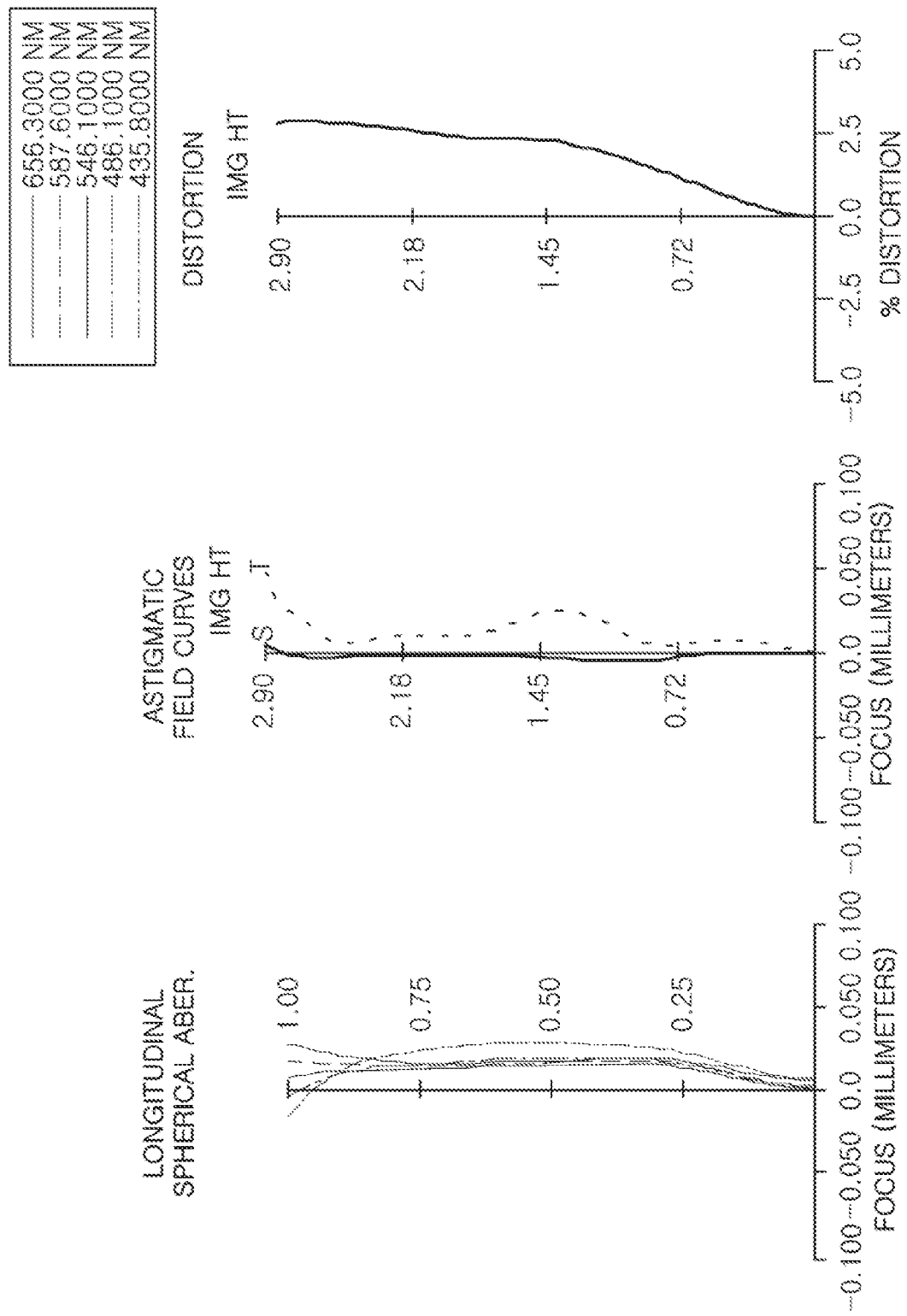
FIGS. 2 and 3 are graphs having curves representing aberration characteristics of the optical imaging system illustrated in FIG. 1.
Figure 3:
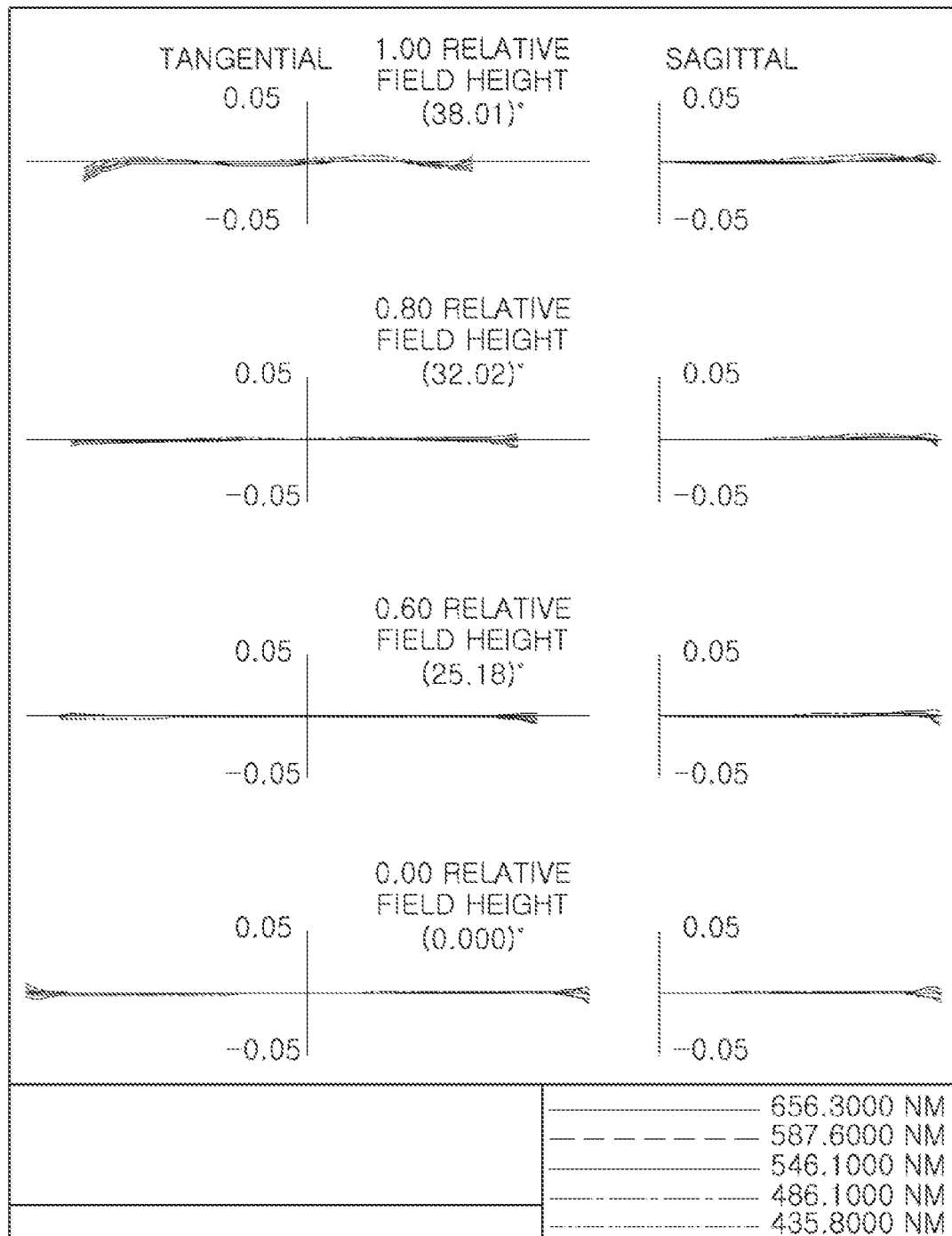

The optical imaging system configured as described above has aberration characteristics as illustrated in FIGS. 2 and 3.

An optical imaging system, according to a second embodiment, will be described with reference to FIGS. 6 through 10.

The optical imaging system, according to the second embodiment, includes an optical system including a first lens 210, a second lens 220, a third lens 230, a fourth lens 240, a fifth lens 250, and a sixth lens 260, and may further include a stop, an infrared cut-off filter 270, and an image sensor 280.

As illustrated in FIG. 9, a focal length (f1) of the first lens 210 is 2.6207 mm, a focal length (f2) of the second lens 220 is −5.9619 mm, a focal length (f3) of the third lens 230 is 12.9714 mm, a focal length (f4) of the fourth lens 240 is −12.446 mm, a focal length (f5) of the fifth lens 250 is −373.7857 mm, a focal length (f6) of the sixth lens 260 is −16.0742 mm, and an overall focal length (f) of the optical imaging system is 3.5947 mm.

In an example, respective characteristics (radii of curvature, thicknesses of lenses or distances between lenses, refractive indices, Abbe numbers, and effective radii) of lenses are illustrated in FIG. 9.

In the second embodiment, the first lens 210 has a positive refractive power, and a meniscus shape of which an object-side surface is convex. For example, a first surface of the first lens 210 is convex in the paraxial region, and a second surface thereof is concave in the paraxial region.

The second lens 220 has a negative refractive power and a meniscus shape of which an object-side surface is convex. For example, a first surface of the second lens 220 is convex in the paraxial region, and a second surface thereof is concave in the paraxial region.

The third lens 230 has a positive refractive power and a meniscus shape of which an image-side surface is convex. For example, a first surface of the third lens 230 is concave in the paraxial region, and a second surface thereof is convex in the paraxial region.

The fourth lens 240 has a negative refractive power, and both surfaces thereof are concave. For example, first and second surfaces of the fourth lens 240 are concave in the paraxial region.

The fifth lens 250 has a negative refractive power, and both surfaces thereof are concave. For example, first and second surfaces of the fifth lens 250 are concave in the paraxial region.

The sixth lens 260 has a negative refractive power, and a meniscus shape of which an object-side surface is convex. For example, a first surface of the sixth lens 260 is convex in the paraxial region, and a second surface of the sixth lens 260 is concave in the paraxial region.

In addition, at least one inflection point is formed on at least one of the first and second surfaces of the sixth lens 260.

The respective surfaces of the first to sixth lenses 210 to 260 may have aspherical coefficients as illustrated in FIG. 10. For example, all of the first and second surfaces of the first lens 210, the second lens 220, the third lens 230, the fifth lens 250, and the sixth lens 260 are aspherical. In addition, the first surface of the fourth lens 240 is spherical, and the second surface thereof is aspherical.

In addition, the stop is disposed between the first and second lenses 210 and 220.

Figure 7:
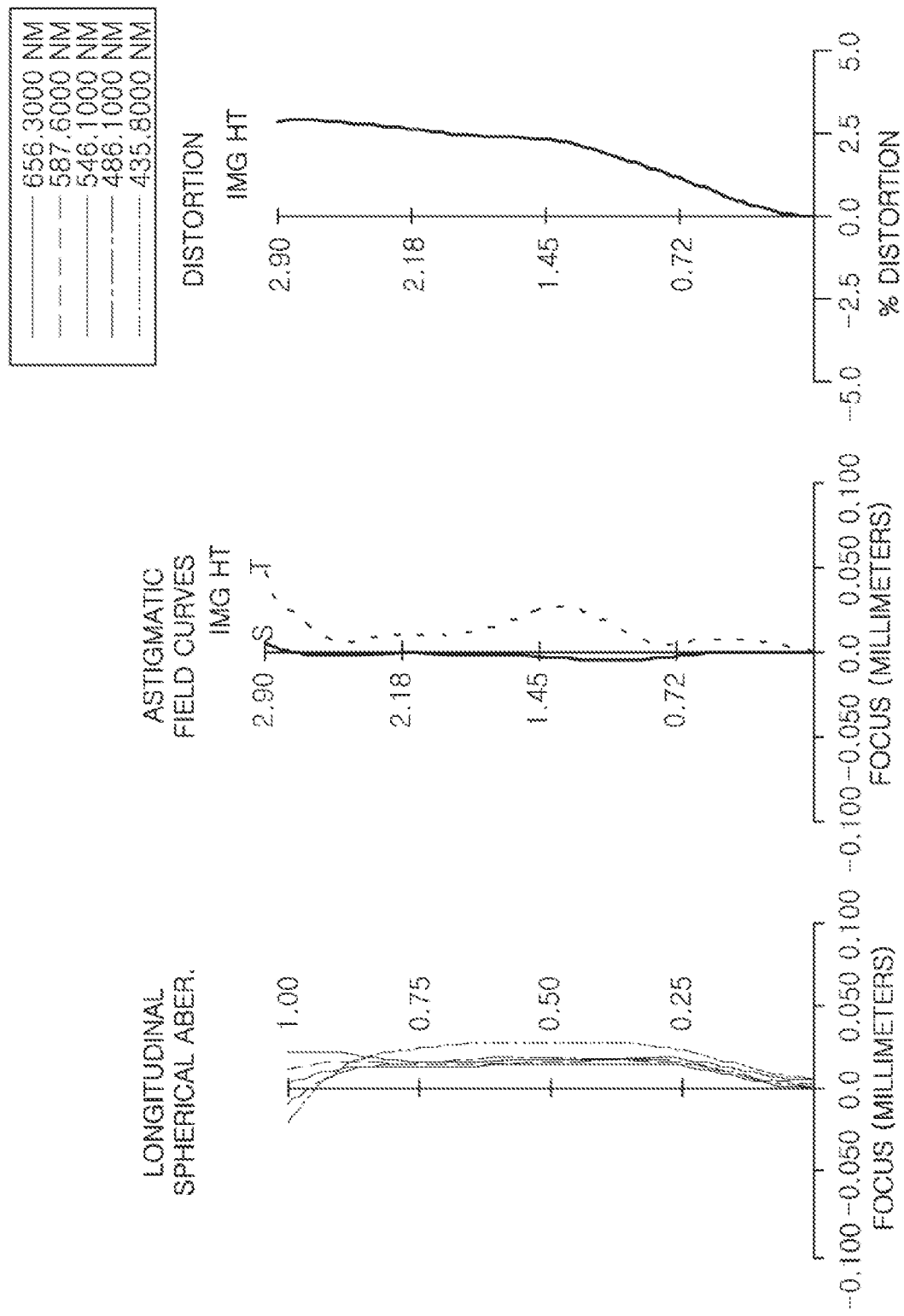
FIGS. 7 and 8 are graphs having curves representing aberration characteristics of the optical imaging system illustrated in FIG. 6.
Figure 8:
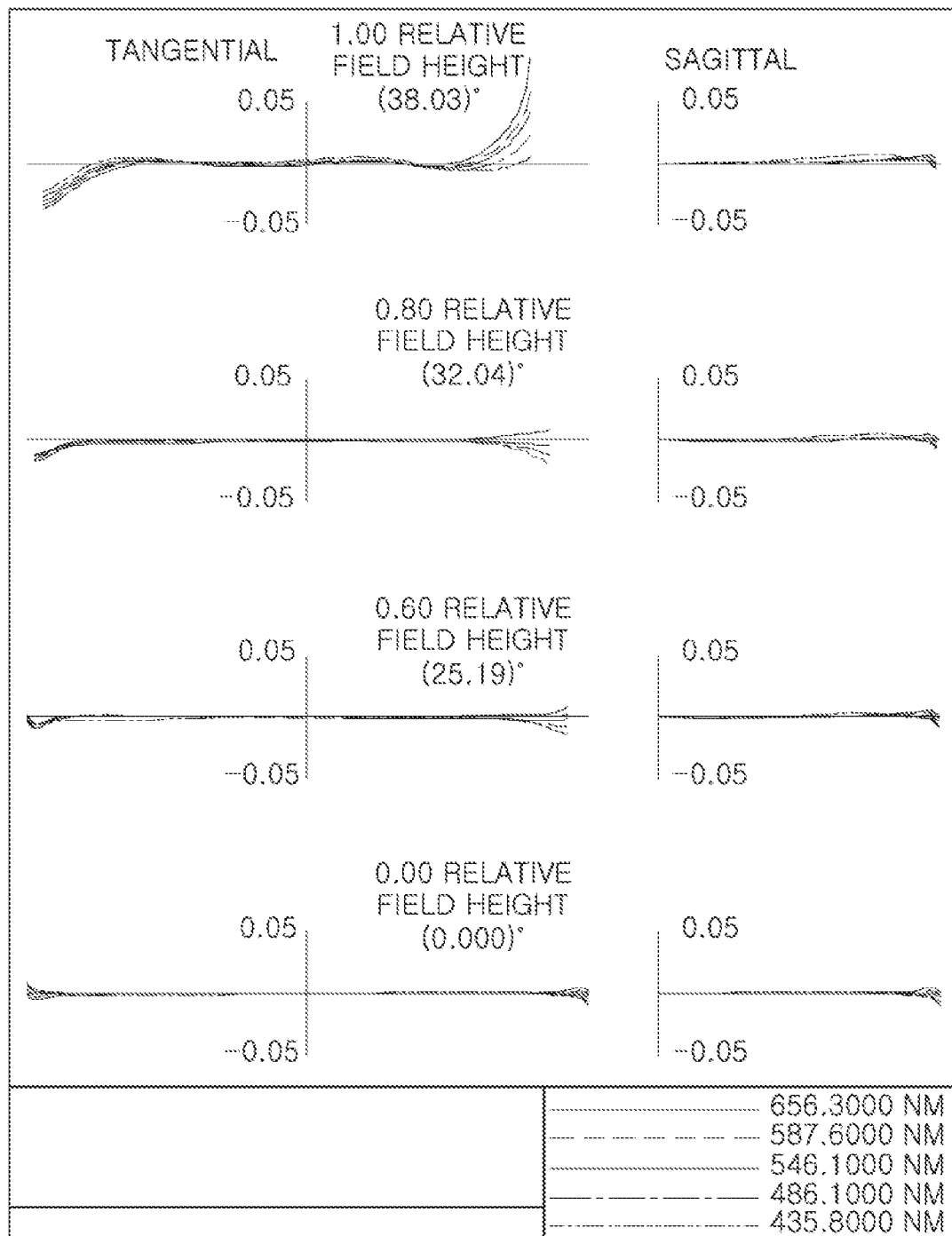

In addition, the optical imaging system configured as described above has aberration characteristics as illustrated in FIGS. 7 and 8.

An optical imaging system, according to a third embodiment, will be described with reference to FIGS. 11 through 15.

The optical imaging system, according to the third embodiment, includes an optical system including a first lens 310, a second lens 320, a third lens 330, a fourth lens 340, a fifth lens 350, and a sixth lens 360, and may further include a stop, an infrared cut-off filter 370, and an image sensor 380.

As illustrated in FIG. 14, a focal length (f1) of the first lens 310 is 2.6206 mm, a focal length (f2) of the second lens 320 is −5.9609 mm, a focal length (f3) of the third lens 330 is 13.0307 mm, a focal length (f4) of the fourth lens 340 is −12.4783 mm, a focal length (f5) of the fifth lens 350 is −362.3299 mm, a focal length (f6) of the sixth lens 360 is −16.1613 mm, and an overall focal length (f) of the optical imaging system is 3.5943 mm.

Here, respective characteristics (radii of curvature, thicknesses of lenses or distances between lenses, refractive indices, Abbe numbers, and effective radii) of lenses are illustrated in FIG. 14.

In the third embodiment, the first lens 310 has a positive refractive power, and a meniscus shape of which an object-side surface is convex. For example, a first surface of the first lens 310 is convex in the paraxial region, and a second surface thereof is concave in the paraxial region.

The second lens 320 has a negative refractive power and a meniscus shape of which an object-side surface is convex. For example, a first surface of the second lens 320 is convex in the paraxial region, and a second surface thereof is concave in the paraxial region.

The third lens 330 has a positive refractive power and a meniscus shape of which an image-side surface is convex. For example, a first surface of the third lens 330 is concave in the paraxial region, and a second surface thereof is convex in the paraxial region.

The fourth lens 340 has a negative refractive power, and both surfaces thereof are concave. For example, first and second surfaces of the fourth lens 340 are concave in the paraxial region.

The fifth lens 350 has a negative refractive power, and both surfaces thereof are concave. For example, first and second surfaces of the fifth lens 350 are concave in the paraxial region.

The sixth lens 360 has a negative refractive power, and a meniscus shape of which an object-side surface is convex. For example, a first surface of the sixth lens 360 is convex in the paraxial region, and a second surface of the sixth lens 360 is concave in the paraxial region.

In addition, at least one inflection point is formed on at least one of the first and second surfaces of the sixth lens 360.

Figure 12:
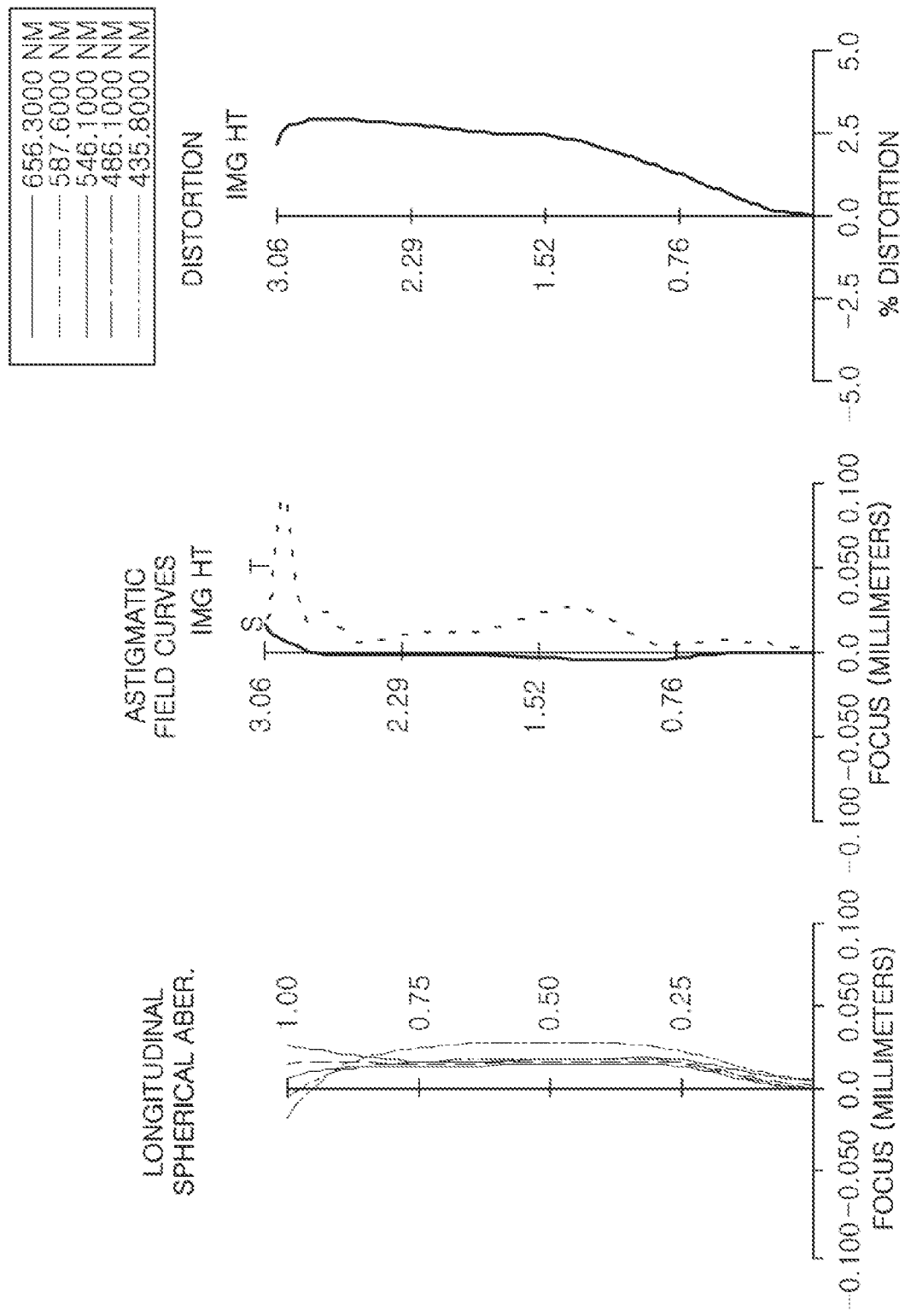
FIGS. 12 and 13 are graphs having curves representing aberration characteristics of the optical imaging system illustrated in FIG. 11.

The respective surfaces of the first to sixth lenses 310 to 360 may have aspherical coefficients as illustrated in FIG. 12. For example, all of the first and second surfaces of the first lens 310, the second lens 320, the third lens 330, the fifth lens 350, and the sixth lens 360 are aspherical. In addition, the first surface of the fourth lens 340 is spherical, and the second surface thereof is aspherical.

In addition, the stop is disposed between the first and second lenses 310 and 320.

Figure 13:
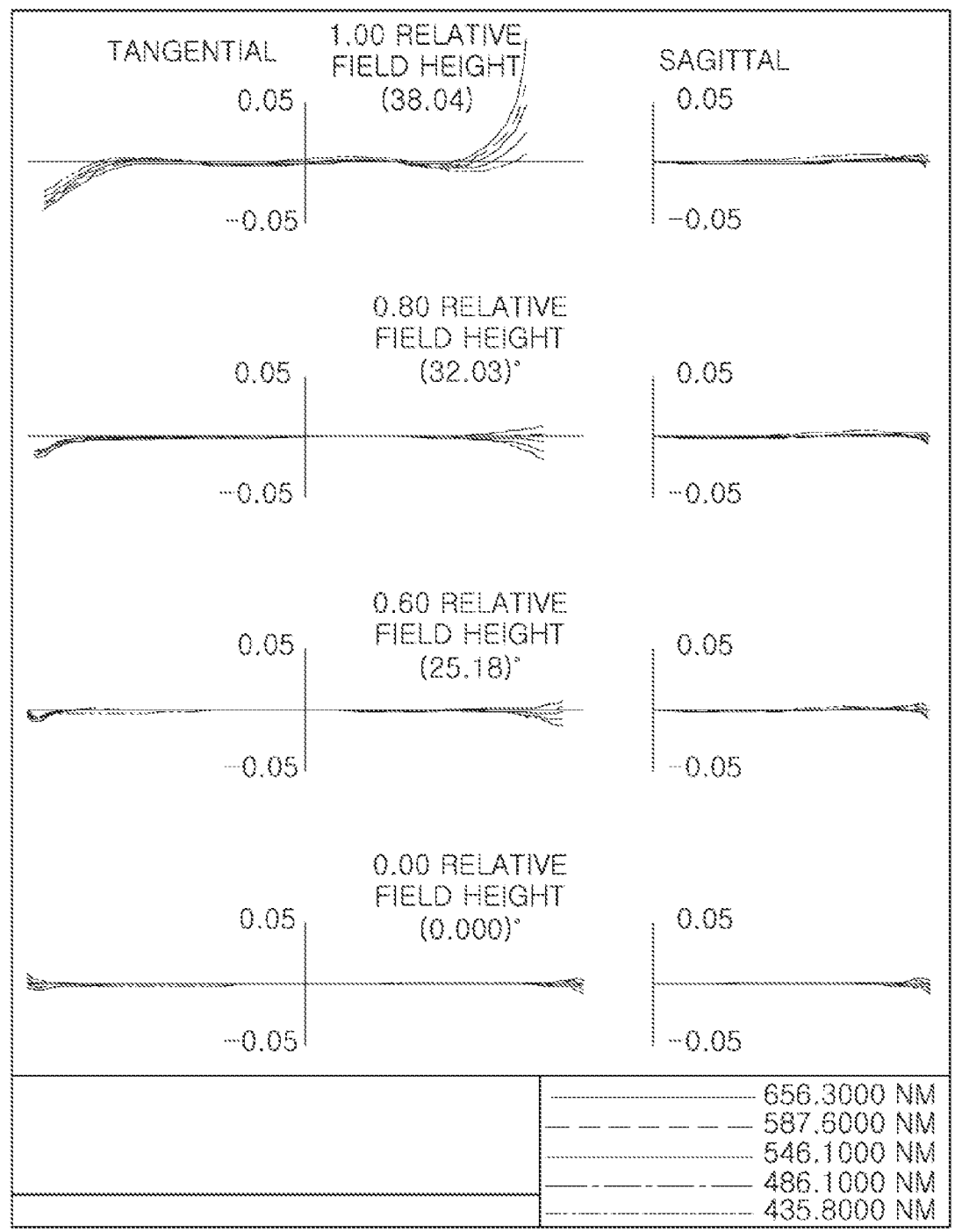

In addition, the optical imaging system configured as described above has aberration characteristics illustrated in FIGS. 12 and 13.

As set forth above, in the optical imaging systems, according to the various embodiments, an aberration improvement effect is increased, a high level of resolution is implemented, an influence due to a manufacturing tolerance or an assembling tolerance is significantly reduced, and productivity is improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens comprising positive refractive power;
a second lens comprising negative refractive power and a refractive index greater than 1.66;
a third lens comprising positive refractive power;
a fourth lens comprising negative refractive power;
a fifth lens comprising refractive power; and
a sixth lens comprising negative refractive power,
wherein the first to sixth lenses are sequentially arranged from an object side to an image side, and
wherein f/(CT3+CT4+CT5)<4.0 is satisfied, where f is an overall focal length of the optical imaging system, CT3 is a thickness of the third lens in a paraxial region, CT4 is a thickness of the fourth lens in the paraxial region, and CT5 is a thickness of the fifth lens in the paraxial region.

2. The optical imaging system of claim 1, wherein TTL/(2*ImgH)<0.75 is satisfied, where TTL is a distance from an object-side surface of the first lens to an imaging plane of an image sensor, and ImgH is half a diagonal length of the imaging plane of the image sensor.

3. The optical imaging system of claim 1, wherein 2.0<f3/f1<6.0 is satisfied, where f1 is a focal length of the first lens, and f3 is a focal length of the third lens.

4. The optical imaging system of claim 1, wherein the second lens has the greatest refractive index among the first to sixth lenses.

5. The optical imaging system of claim 1, wherein the first lens comprises a convex object-side surface and a concave image-side surface.

6. The optical imaging system of claim 1, wherein the second lens comprises a convex object-side surface and a concave image-side surface.

7. The optical imaging system of claim 1, wherein the third lens comprises a convex image-side surface.

8. The optical imaging system of claim 1, wherein the fourth lens comprises a concave object-side surface.

9. The optical imaging system of claim 1, wherein the fourth lens comprises a concave image-side surface.

10. The optical imaging system of claim 1, wherein the fifth lens comprises a concave image-side surface.

11. The optical imaging system of claim 10, wherein the fifth lens comprises negative refractive power.

12. The optical imaging system of claim 1, wherein the sixth lens comprises a concave image-side surface.

13. The optical imaging system of claim 12, wherein the sixth lens comprises a convex object-side surface.

14. An optical imaging system comprising:
a first lens comprising positive refractive power;
a second lens comprising negative refractive power and a refractive index greater than 1.66;
a third lens comprising positive refractive power;
a fourth lens comprising refractive power and comprising a concave object-side surface;
a fifth lens comprising refractive power; and
a sixth lens comprising negative refractive power,
wherein the first to sixth lenses are sequentially arranged from an object side to an image side, and
wherein f/(CT3+CT4+CT5)<4.0 is satisfied, where f is an overall focal length of the optical imaging system, CT3 is a thickness of the third lens in a paraxial region, CT4 is a thickness of the fourth lens in the paraxial region, and CT5 is a thickness of the fifth lens in the paraxial region.

15. An optical imaging system comprising:
a first lens comprising positive refractive power;
a second lens comprising negative refractive power and a refractive index greater than 1.66;
a third lens comprising positive refractive power;
a fourth lens comprising refractive power;
a fifth lens comprising negative refractive power; and
a sixth lens comprising negative refractive power,
wherein the first to sixth lenses are sequentially arranged from an object side to an image side, and
wherein f/(CT3+CT4+CT5)<4.0 is satisfied, where f is an overall focal length of the optical imaging system, CT3 is a thickness of the third lens in a paraxial region, CT4 is a thickness of the fourth lens in the paraxial region, and CT5 is a thickness of the fifth lens in the paraxial region.

* * * * *